United States Patent [19]

Healey

[11] Patent Number: 4,480,809
[45] Date of Patent: Nov. 6, 1984

[54] GIMBAL BRACKET MOUNTING FOR INSTRUMENT

[75] Inventor: Robert W. Healey, Tulsa, Okla.

[73] Assignee: Lowrance Electronics, Inc., Tulsa, Okla.

[21] Appl. No.: 421,721

[22] Filed: Sep. 22, 1982

[51] Int. Cl.³ ............................................ F16M 11/10
[52] U.S. Cl. .................................... 248/185; 248/252; 248/291; 362/371
[58] Field of Search ............... 248/185, 291, 323, 324, 248/293, 292.1, 551, 311.2, 474, 480; 362/371

[56] References Cited

U.S. PATENT DOCUMENTS

| | | | |
|---|---|---|---|
| 1,173,082 | 2/1916 | Ayers | 248/252 |
| 3,086,107 | 4/1963 | Grover | 362/371 |
| 3,505,515 | 4/1970 | Adra | 362/371 |
| 4,196,821 | 4/1980 | Teti | 248/291 X |

Primary Examiner—Ramon S. Britts
Assistant Examiner—Sarah A. Lechok
Attorney, Agent, or Firm—Head, Johnson & Stevenson

[57] ABSTRACT

An improved support for pivotally mounting an instrument housing formed of a bracket having spaced apart parallel planar portions which are normally of spacing less than the width of the housing and deflectable outward relative to each other, each of the bracket planar portions having an opening therein, the openings being in a common axis and each having a slot extending from a surface of the bracket and communicating with the opening, the width of the slot being less than the diameter of the opening, the housing having internally threaded tubular trunnions on opposite sides thereof in alignment, the diameter of the trunnions being less than the diameter of the opening in the bracket planar portions and greater than the width of the slots, and a pair of knobs, each having a threaded portion extending therefrom that are threadably received in the trunnion threaded openings, the diameter of the threaded portions being less than that of the slots so that when the knobs are loosened the bracket planar portions may be spread apart and the instrument removed from the bracket by the threaded portion of the knobs passing through the slots without removing the knobs.

3 Claims, 2 Drawing Figures

GIMBAL BRACKET MOUNTING FOR INSTRUMENT

BRIEF SUMMARY OF THE INVENTION

An improved means for supporting an instrument housing, such as a sonar type depth indicating instrument or the like, is provided in this disclosure. The instrument is contained in a housing and supported by a bracket in a manner so that the instrument may be tilted relative to the bracket to adjust for the convenience of the user. The bracket has a base portion and integral upstanding parallel side portions terminating in their upper ends with paralleled planar portions. Each of the planar portions has an opening therein, the openings being in a common axis. Each of the planar portions also has a slot therein extending from one edge and communicating with the opening, the slots being in a common plane. The width of the slots is less than the diameter of the openings.

Extending from opposite sides of the instrument housing is a tubular internally threaded trunnion member, the trunnions being in a common axis. The external diameter of the trunnions is less than the diameter of the openings in the bracket and greater than the width of the slots formed in the bracket.

Received on each of the trunnions is a resilient washer, and the trunnions are of a length to extend beyond the resilient washer approximately the thickness of the bracket planar portions.

Holding the instrument housing in selectable fixed positions relative to the support bracket are a pair of knobs, one for each side of the instrument, and each knob having an integral threaded shaft portion which is threadably received in the internal threaded opening in the tubular trunnions. The diameter of the shaft portion is less than the width of the support bracket slots. Received on the threaded shank portion of each of the knobs is a resilient washer.

To mount the housing on the support brackets the planar portions are spread apart slightly, allowing the trunnions to extend into the openings. The threaded shank portions of each knob are then tightened in position to retain the housing in selected angular position relative to the bracket. To change the angular position, each knob is rotated sufficient to loosen it, allowing the housing to be pivoted relative to the bracket.

To remove the housing from the bracket the knobs are loosened but not removed from the trunnions. The planar portions of the brackets may be then spread apart to disengage the trunnions from the openings in the brackets and allowing the threaded shank portions of the knobs to pass through the slots.

In a preferred arrangement each of the trunnions has a reduced diameter external groove formed adjacent the housing. The groove receives the resilient washer positioned on the trunnion. When the housing is removed from the support bracket the washers are retained in proper positions on the trunnions.

DETAILED DESCRIPTION

Figure 1:
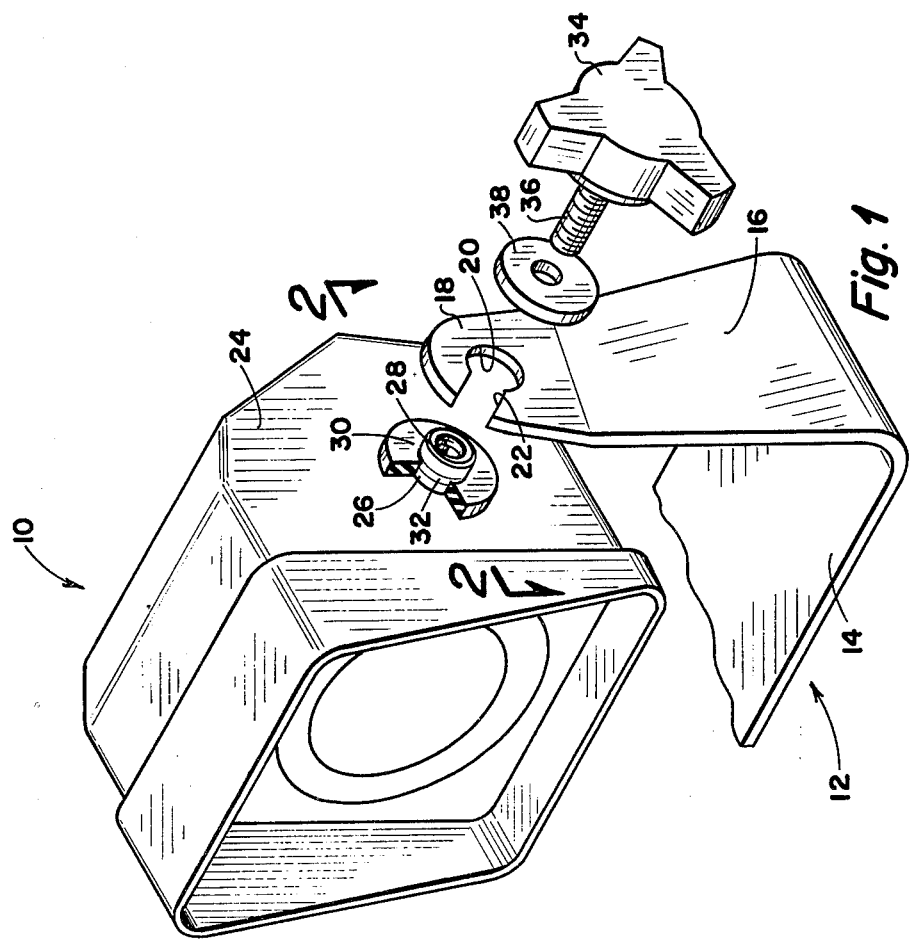
FIG. 1 is an isometric view of an instrument housing, such as a sonar type instrument as used by fishermen and a portion of a bracket. Part of the base and one leg of the bracket is shown. The bracket has an opposite leg of the same configuration as that shown.

Referring to the drawings, and first to FIG. 1, a preferred embodiment of the invention is illustrated. An instrument housing is indicated generally by the numeral 10 and may be any type of instrument which is pivotally supported so that the angle of the instrument relative to its support base may be adjusted for the benefit of the user. The instrument depicted in FIG. 1 is that of a sonar type depth locator and fish indicator as used by sport fishermen and in which the instrument is typically used on a boat. While a sonar type instrument is illustrated to exemplify the invention, it is understood that the instrument contained in the housing 10 may be of any type.

To support the instrument housing 10 a bracket generally indicated by the numeral 12 is provided. The bracket 12 includes a base 14 which is adapted to rest on a support surface or be affixed to a support surface such as a portion of a boat or the like. Base 14 may be particularly configured to match the support surface on which it is positioned or may be planar as illustrated. At each end of the base portion is an upstanding arm portion 16, only one of which arm portions is shown in FIG. 1, the other being like it. At the upper end of the arm portion 16 is an integral planar portion 18. The planar portions 18 on each side of the base 14 are parallel to each other.

Formed in each of the planar portions 18 is an opening 20. Extending from one edge of the bracket and communicating with opening 20 is a slot 22. The width of slot 22 is less than the diameter of opening 20. The openings in the opposed bracket planar portions are in a common axis, and the slots are in a common plane.

Instrument housing 10 includes a side panel 24 on each side thereof, only one of the side panels being seen in the view of FIG. 1. Extending from each of the side panels is a tubular trunnion 26. Each of the trunnions has an internal axial internally threaded opening 28. The trunnions on opposite side of the housing 10 are in a common axis.

The external diameter of trunnions 26 is less than the internal diameter of openings 20 and greater than the width of slots 22.

Positioned on each trunnion 26 is a resilient washer 30. In the preferred arrangement each trunnion 26 has a reduced diameter external circumferential notch 32 (See FIG. 2). The resilient washer 30 is configured so that the opening therein is less than the normal diameter of the trunnion 26 so that it is resiliently received in notch 32 by which the washer 30 is held in place but can be readily removed and replaced if necessary.

The length of each of the trunnions 26 extending from side panel 24 is equal to approximately the thickness of washer 30 and the thickness of the bracket planar portion 18.

To retain the housing 10 in position relative to the bracket 12 are a pair of knobs 34, only one of which is illustrated. Each knob 34 has an integral threaded shank portion 36, the diameter of which is less than the width of slots 22 formed in the bracket. Knobs 34 may be of circular configuration or may be non-circular as illustrated to facilitate manually rotating the knobs.

Received on the shank portion 36 of each of the knobs is a resilient washer 38.

Figure 2:
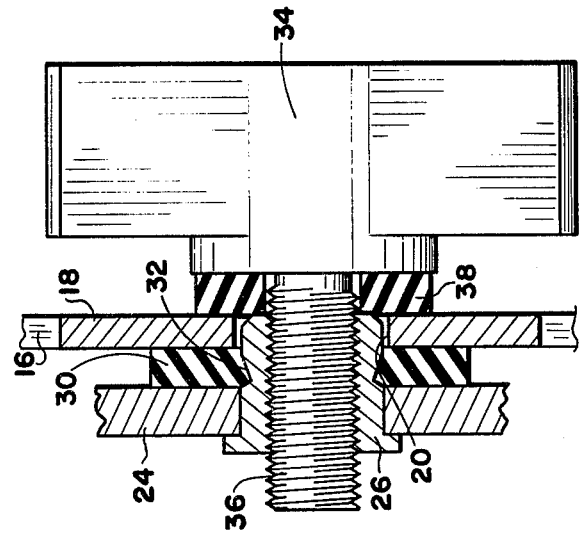
FIG. 2 is a fragmentary cross-sectional view taken along the line 2—2 of FIG. 1.

FIG. 2 is a cross-sectional view of the housing in position on the bracket with knob 34 securing it in a preselected angular relationship relative to the bracket. It can be seen that with knob 34 tightened the housing will not shift from its angular position relative to the bracket. To change the angular position the knob 34 is rotated a sufficient amount, such as a few degrees, up to a turn or more, depending upon the amount of compressibility of the resilient washers 30 and 38 and without removing the knobs from the trunnions. The trunnions 26 are readily rotatable in the openings 20 formed in the bracket planar portions so that the angular relationship of the housing to the support bracket is readily adjusted, after which the position can be maintained by tightening knobs 34 on opposite sides of the housing.

In many applications it is desirable to have means for readily removing the instrument from its mounting. This is particularly true when the instrument is of the type utilized in a boat. Most boats are left unattended for long lengths of time, and it is common practice of fishermen to remove instruments to prevent damage from weathering or loss from theft. To remove the instrument 10 from bracket 12 all that is necessary is that the knobs 34 on each side of the housing be loosened a few turns, but not removed. The bracket arm portions 16 may be spread apart slightly so that the trunnions 26 are withdrawn from openings 20. The instrument can then be removed by the knob shank portions 36 passing through slots 22. In this way the knobs, including the washers 30 and 38, do not have to be removed from the housing 10, and thereby the possibility of them becoming lost or misplaced is eliminated. In addition, the arrangement facilitates the ready replacement of the instrument back onto the bracket.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. An improved means of pivotally supporting a housing comprising:

a support bracket in combination with a housing, said bracket having spaced apart parallel planar portions, the housing being received between the planar portions, each of the bracket planar portions having an opening therethrough of preselected diameter, the openings being coaxial, and the bracket planar portions each having slots extending from one edge thereof and communicating with the opening therein, the width of said slots being less than the diameter of said openings, the bracket planar portions being normally spaced apart of a width equal to or less than the width of the housing and being resiliently deflectable away from each other;

tubular trunnions extending in a common axis from opposite sides of the housing, each trunnion having an external diameter less than the diameter of said openings in said bracket planar portions and greater than the width of said slots, the tubular opening in each of said trunnions being threaded; and a pair of knobs, each having a threaded portion extending therefrom which are threadably receivable in said trunnion threaded openings, the diameter of said threaded portions being less than the width of said bracket slots whereby said knobs may be loosened with said threaded portions received in said trunnion openings and said bracket planar portions spread apart beyond the outer ends of said trunnions and the housing removed from the brackets by the threaded portions of said knobs passing through said slots.

2. The improved means of claim 1 including a resilient washer received about each of said trunnions and positioned between said bracket planar portions and the housing.

3. The improved means of claim 1 wherein each of said trunnions has a circumferential notch of reduced external diameter adjacent the housing and a resilient washer received on each of said trunnions and received in said circumferential notches whereby the washers are retained on said trunnions.

* * * * *